United States Patent [19]

Park

[11] Patent Number: 5,724,471
[45] Date of Patent: Mar. 3, 1998

[54] AUTOMATIC PHASE CONTROL METHOD AND APPARATUS EMPLOYING A REGION DETERMINER

[75] Inventor: Kyu-yeol Park, Suwon, Rep. of Korea

[73] Assignee: Samsung Electronics Co., Ltd., Kyungki-Do, Rep. of Korea

[21] Appl. No.: 555,096

[22] Filed: Nov. 8, 1995

[30] Foreign Application Priority Data

Jan. 26, 1995 [KR] Rep. of Korea .................. 95-1416

[51] Int. Cl.⁶ ........................................... H04N 9/70
[52] U.S. Cl. ................... 386/41; 386/11; 386/13
[58] Field of Search .................. 386/11, 13, 14, 386/19, 28, 41, 1, 58; 348/509, 505, 536; H04N 9/70

[56] References Cited

U.S. PATENT DOCUMENTS 3,624,274  11/1971  Araki ........................ 348/505
4,209,800   6/1980  Yamamitsu et al. ............ 386/11
4,337,477   6/1982  Sagisshima et al. ........... 348/509

*Primary Examiner*—Thai Tran
*Assistant Examiner*—Huy Nguyen

*Attorney, Agent, or Firm*—Sughrue, Mion, Zinn, Macpeak & Seas, PLLC

[57] ABSTRACT

An automatic phase control method and automatic phase controller suitable for the method are disclosed, which can effectively cope with a phase error which is outside a proper operation region of a phase comparator, in which the phase comparator detects a phase difference between a reproduced color signal and a reference color signal. The automatic phase controller includes a region determiner for determining whether the phase difference between the burst signal and the reference color signal is in a positive or negative characteristic region for the phase comparator, and a phase inverter located between the reference color signal generator and the phase comparator, for providing the reference color signal generated from the reference color signal generator to the phase comparator if it is determined by the region determiner that the phase difference between the burst signal and the reference color signal is in the positive characteristic region of the phase comparator. The region determiner also inverts the phase of the reference color signal generated from the reference color signal generator and provides the phase-inverted result to the phase comparator if it is determined that the phase difference is in the negative characteristic region of the phase comparator. Therefore, a rapid and stable phase control operation can be performed by the automatic phase controller.

16 Claims, 3 Drawing Sheets

AUTOMATIC PHASE CONTROL METHOD AND APPARATUS EMPLOYING A REGION DETERMINER

BACKGROUND OF THE INVENTION

1. Field of the Invention

The present invention relates to an automatic phase control method and apparatus for use in a laser disk player, a video tape recorder and the like. More particularly, it relates to an automatic phase control method and an automatic phase controller which can effectively cope with any phase error output from a phase comparator which detects the phase difference between a reproduced color signal and a reference color signal.

The present application for an automatic phase control method and apparatus for use in a laser disk player, is based on Korean Application No. 95-1416 which is incorporated herein by reference for all purposes.

2. Description of the Prior Art

In a color video processor such as a laser disk player or video tape recorder, the reproduced color signal inherently exhibits fluctuation along the time-axis, i.e., jitter. Here, an automatic phase controller is employed for removing this time-axis fluctuation. The automatic phase controller uses a phase comparator to detect the phase difference between the color burst signal included within the reproduced color signal and an internally generated reference color signal. It then compensates the phase of the reproduced color signal using the detected phase difference. Thus, the phase comparator should perform a stable phase difference detecting operation.

The phase comparator, however, exhibits certain operational characteristics; that is, a positive characteristic region and a negative characteristic region. In the positive region the detected phase error signal increases in proportion to the phase difference between the burst signal and the reference color signal. In this region, the automatic phase controller operates normally. On the other hand, in the negative region the detected phase error signal decreases in proportion to the phase difference. In this region, that is the negative region, operation of the controller constitutes an abnormal operation of the automatic phase controller. The conventional automatic phase controller incorporates a color killer circuit to blank the color signal output when the phase error signal is outside the phase comparator's positive characteristic region. However, such blanking prevents the color signal from being faithfully reproduced.

SUMMARY OF THE INVENTION

To solve the above problem, it is an object of the present invention to provide an improved automatic phase control method in which the phase control operation can be normally performed while operating in the negative characteristic region of a comparator.

It is another object of the present invention to provide an automatic phase controller suitable for performing the above-described automatic phase control method.

To achieve the above first object, there is provided an automatic phase control method comprising the steps of:

(a) determining whether a phase difference between a reproduced color signal and a reference color signal, determined by a detector, is within a positive characteristic region of said phase comparator;

(b) detecting the phase difference between said reproduced color signal and said reference color signal if in step (a) it is determined that said phase difference between said reproduced color signal and said reference color signal is in said positive characteristic region of the phase comparator, and inverting the phase of the reference color signal thereby producing a phase-inverted reference color signal and then detecting the phase difference between said reproduced color signal and said phase-inverted reference color signal if it is determined that said phase difference is not in said positive characteristic region; and (c) controlling the phase of said reproduced color signal based on the phase difference detected in said step (b).

To achieve the above second object, there is provided an automatic phase controller, which receives a reproduced color signal, comprising:

a region determiner for determining whether a phase difference between a burst signal from the reproduced color signal and a reference color signal generated by a reference color signal generator, wherein said phase difference is detected by a phase comparator, is within one of a positive and negative characteristic region of said phase comparator; and a phase inverter connected to said reference color signal generator and said phase comparator, outputting said reference color signal to said phase comparator if said region determiner determines that said phase difference between said burst signal and said reference color signal is in said positive characteristic region of said phase comparator, and inverting the phase of said reference color signal and outputting a phase-inverted reference color signal to said phase comparator if said region determiner determines that said phase difference is in said negative characteristic region of said phase comparator.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
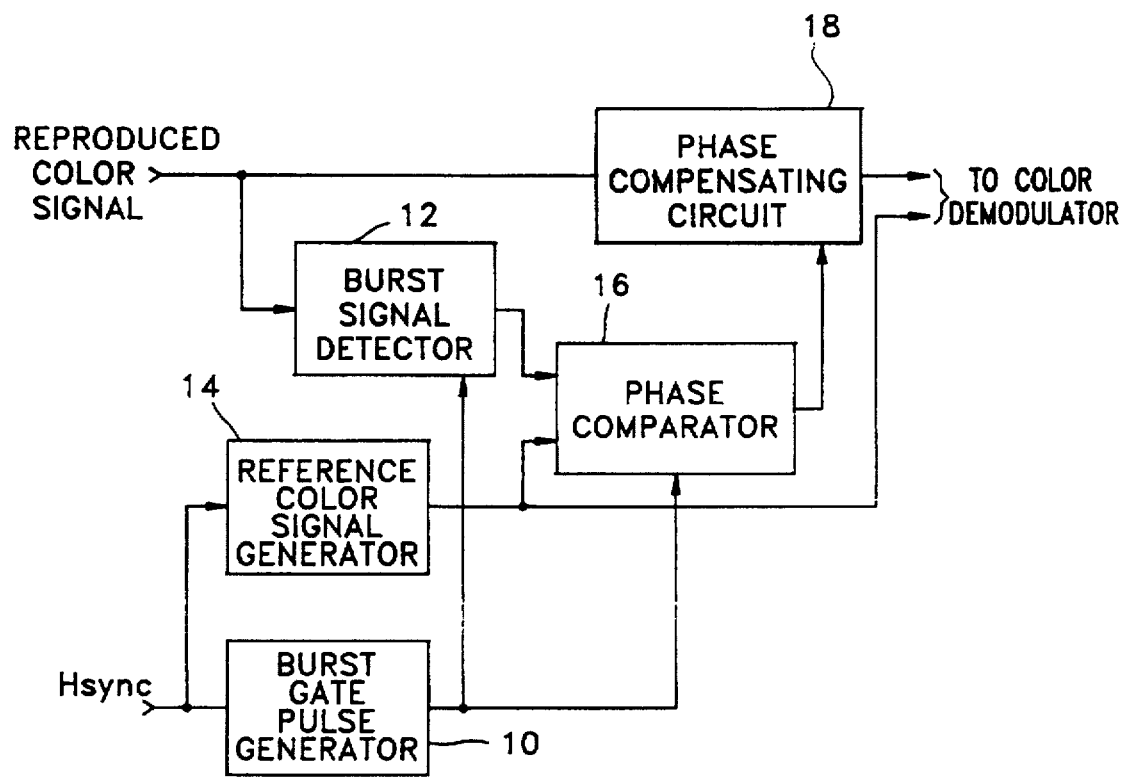
FIG. 1 is a block diagram showing a conventional automatic phase controller.

FIG. 1 shows a conventional automatic phase controller which includes a burst gate pulse generator 10, a burst signal detector 12, a reference color signal generator 14, a phase comparator 16, and a phase compensating circuit 18.

Burst gate pulse generator 10 generates a burst gate pulse by receiving a horizontal synchronous (Hsync) signal separated from a reproduced composite video signal. The burst gate pulse is active during the burst signal period of the composite video signal. (The timing relationship between the horizontal synchronous signal and the burst signal is prescribed in EIA RS-170A.)

Burst signal detector 12 detects the burst signal included within the reproduced color signal by using the burst gate pulse generated from burst gate pulse generator 10.

Reference color signal generator 14 outputs a reference color signal of 3.58 MHz (for NTSC systems) synchronized with the horizontal synchronous signal.

Phase comparator 16 generates a phase error signal corresponding to the phase difference between the burst signal, extracted from the reproduced color signal by burst signal detector 12, and the reference color signal output from reference color signal generator 14. Phase comparator 16 then provides a phase error signal representing the result of the comparison to phase compensating circuit 18.

Phase compensating circuit 18 compensates the phase of the reproduced color signal according to the phase error signal provided from phase comparator 16. Thus, the color signal output from phase compensating circuit 18 is jitter-compensated when the color signal is reproducing.

Figure 2:
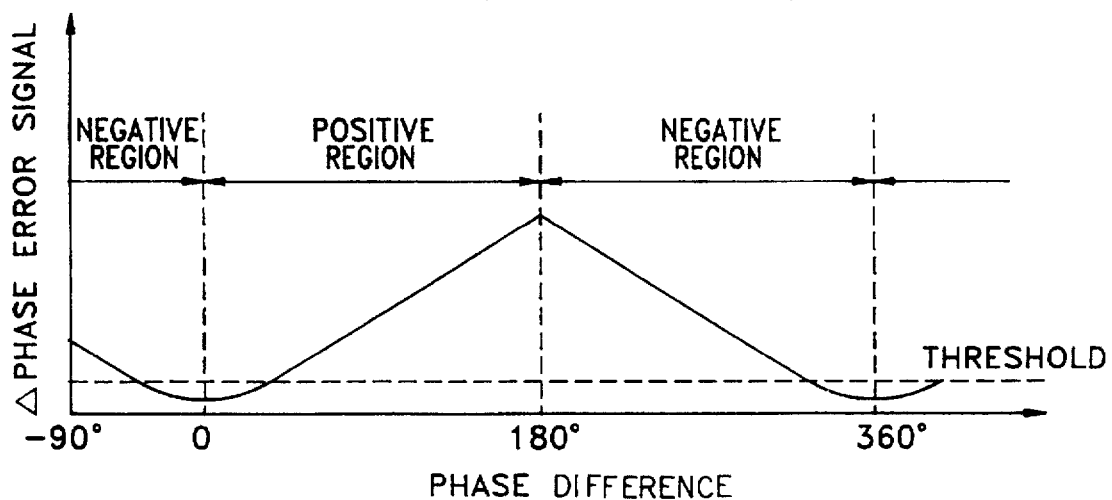
FIG. 2 is a diagram showing the operational characteristic of the phase comparator shown in FIG. 1.

FIG. 2 is a diagram showing the operational characteristic of the phase comparator shown in FIG. 1. Here, the horizontal axis represents the phase difference and the vertical axis represents the change (Δ) in the phase error signal, and the negative and positive characteristic regions, as described above, are shown. That is, the phase comparator exhibits the positive characteristic when the phase difference is within the range from 0° to 180° and it exhibits the negative characteristic when the phase difference is within the range from −90° to 0° and from 180° to 360°. The phase difference falls within the negative characteristic region due to generation of a very large phase difference, which occurs when a special reproduction operation (e.g., a still screen or variable speed mode) is performed in a laser disk player. Thus, phase compensation is not performed normally when the phase comparator exhibits the negative operational characteristic.

The automatic phase control method according to the present invention operates as follows.

Figure 3:
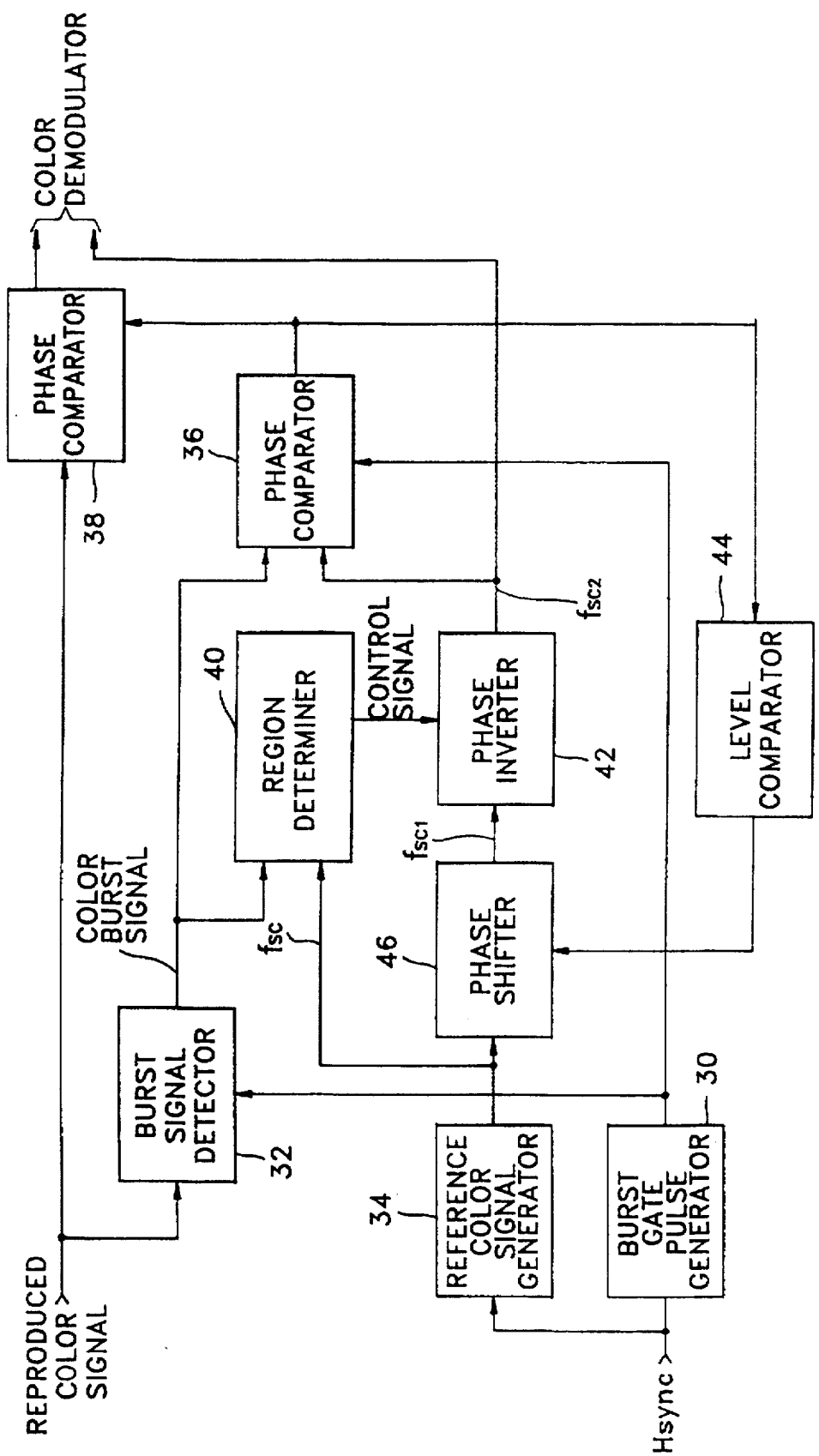
FIG. 3 is a block diagram showing an automatic phase controller according to the present invention.

First, it is determined whether the phase difference between the reproduced color signal and the reference color signal ($f_{sc}$) exists in the positive characteristic region for the phase comparator, as shown in FIG. 3. Then, if it is determined that the phase difference exists in the positive characteristic region, the phase difference is simply detected. Otherwise, the phase of the reference color signal is inverted producing a phase-inverted reference color signal ($f_{sc2}$), and the phase difference between the reproduced color signal and the phase-inverted reference color signal ($f_{sc2}$) is detected. Thereafter, the phase of the reproduced color signal is controlled based on the detected phase difference.

The conventional automatic phase controller generally operates under feedback control, thus, abrupt phase changes are not properly controlled.

According to the automatic phase control method of the present invention, when the phase difference exists in the negative characteristic region for the phase comparator due to a very large phase difference, the phase of the reference color signal ($f_{sc}$) is inverted for a feed-forward control, so that the problem of an error in the automatic phase controller can be solved.

FIG. 3 is a block diagram showing an automatic phase controller according to the present invention. As shown in FIG. 3 the automatic phase controller includes a burst gate pulse generator 30, a burst signal detector 32, a reference color signal generator 34, a phase comparator 36, a phase compensating circuit 38, a region determiner 40, a phase inverter 42, a level comparator 44, and a 90° phase shifter 46. (Here, burst gate pulse generator 30, burst signal detector 32, reference color signal generator 34, phase comparator 36 and phase compensating circuit 38 operate the same as the corresponding components in the conventional automatic phase controller, and thus the description in this regard is omitted herein.)

Region determiner 40 determines whether the phase difference between the burst signal extracted from the reproduced color signal via burst signal detector 32, and the reference color signal ($f_{sc}$) generated from reference color signal generator 34 exists in the positive or negative characteristic region as shown in FIG. 2. Here, if the phase difference is within the range of 0° to 180°, region determiner 40 determines that the phase difference exists in the positive characteristic region, and normal operation is performed. However, if the phase difference is within the range of −90° to 0° or 180° to 360°, region determiner 40 determines that the phase difference exists in the negative characteristic region, whereupon phase inverter 42 inverts the output ($f_{sc1}$) of 90° phase shifter 46 and provides the result ($f_{sc2}$) to phase comparator 36 and to a color demodulator (not shown).

Assuming that there is no phase shifting in 90° phase shifter 46 as will be described later, if the phase difference exists in the negative characteristic region for phase comparator 36, phase inverter 42 inverts the phase of the reference color signal ($f_{sc1}$) output from 90° phase shifter 46 and then provides the phase-inverted signal to phase comparator 36. Accordingly, since phase comparator 36 operates in the positive characteristic region, and a phase control operation is performed which is stable as well as having a sensitive response characteristic.

On the other hand, inaccurate phase compensation is performed when the phase difference is in the non-linear characteristic region shown in FIG. 2, i.e., below the dashed lines. This situation occurs when there is a small phase difference between the burst signal and the reference color signal ($f_{sc}$). Accordingly, in such a situation a malfunction of the phase controller may occur in the peak portion between the positive and negative characteristic regions. Level comparator 44 and 90° phase shifter 46 perform the function of correcting such inaccurate phase compensation and the corresponding malfunction.

Level comparator 44 determines whether the output of phase comparator 36 is below a predetermined threshold level, as shown in FIG. 2. The region below the threshold level corresponds to the non-linear characteristic region or the peak portion between the positive and negative characteristic regions.

If level comparator 44 determines that the output of phase comparator 36 is below such a threshold, 90° phase shifter 46 shifts the phase of reference color signal ($f_{sc}$) generated from reference color signal generator 34 by 90°, and provides the phase-shifted result to phase inverter 42.

Figure 4:
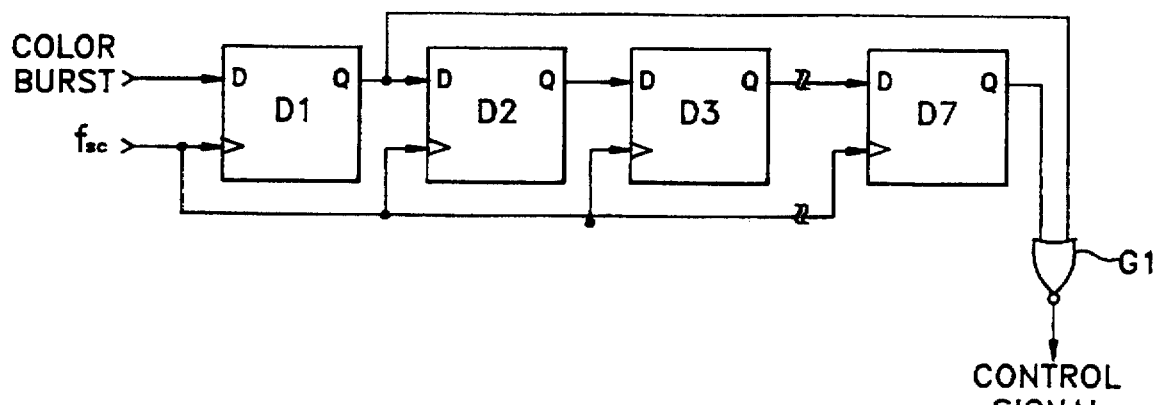
FIG. 4 is a block diagram showing a structure of the region determiner of FIG. 3.

FIG. 4 is a block diagram showing an example of a structure of region determiner 40 of FIG. 3 in greater detail. Here, the region determiner is comprised of seven delay circuits (for example, in the form of D flip-flops) D1 to D7, and a NOR gate G1.

In order to reduce the phase detector error, only 7-cycles of the color burst are gated by the burst gate pulse even though the color burst signal consists of eight to ten cycles. The remaining intervals are output from burst signal detector 32 as a high state.

Region determiner 40 uses the color burst signal output from burst signal detector 32 as an input signal to first delay circuit D1, and it uses the reference color signal ($f_{sc}$) as a clock signal. Thus, the color burst signal is delayed by delay circuits D1 to D7 using the reference color signal ($f_{sc}$) as the clock. The outputs of the first and last delay circuits D1 and D7 are used as the input signal to NOR gate G1, and the output of NOR gate G1 is used as the control signal input to phase inverter 42.

Figure 5A:
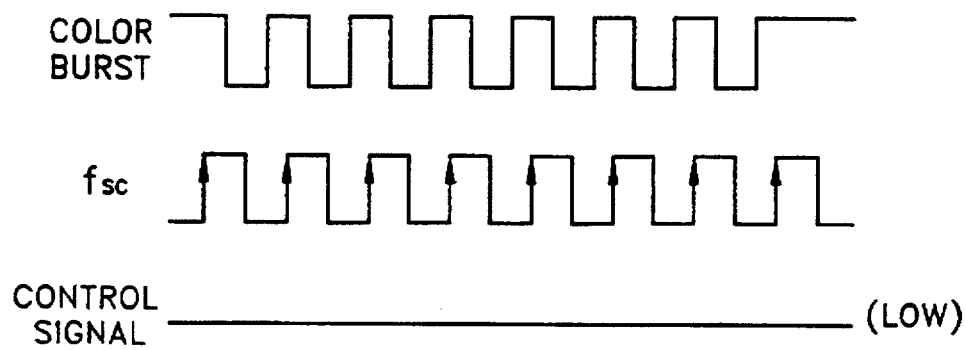
FIGS. 5A and 5B are timing diagrams showing the operation of the region determiner of FIG. 3, in the positive and negative characteristic regions, respectively.

When the phase difference is located within the positive characteristic region, the outputs of delay circuits D1 and D7 are high, so that the control signal output of NOR gate G1 goes low as shown in FIG. 5A.

Figure 5B:
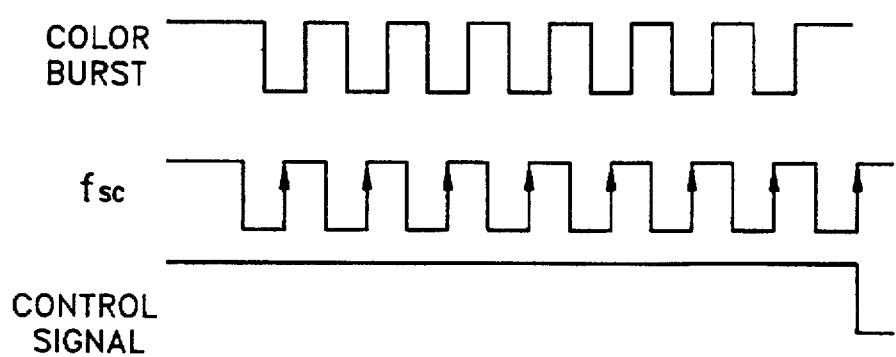

When the phase difference is located within the negative characteristic region, the outputs of delay circuits D1 and D7 are low, so that the control signal output of NOR gate G1 goes high and phase inverter 42 is controlled accordingly, as shown in FIG. 5B.

As described above, in the automatic phase controller according to the present invention, the phase of the reference color signal is inverted by a phase inverter when the phase comparator operates in a negative characteristic region, due to a very large phase difference between the burst signal and the reference color signal. As a result, the phase comparator operates in a positive characteristic region, and rapid and stable phase control operation is guaranteed.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An automatic phase control method comprising the steps of:
   (a) determining whether a first phase difference which is a phase difference between a reproduced color signal and a reference color signal, determined by a detector, is within a positive characteristic region of a phase comparator;
   (b) detecting said first phase difference if in step (a) it is determined that said first phase difference is in said positive characteristic region of said phase comparator, and inverting the phase of said reference color signal thereby producing a phase-inverted reference color signal and then detecting a second phase difference which is a phase difference between said reproduced color signal and said phase-inverted reference color signal if it is determined that said first phase difference is not in said positive characteristic region; and
   (c) controlling the phase of said reproduced color signal based on one of the first and second phase differences detected in said step (b).

2. The automatic phase control method as claimed in claim 1, further comprising the steps of:
   (d) determining whether a level of said one of the first and second phase differences detected in said step (b) is below a predetermined threshold; and
   (e) shifting the phase of said reference color signal if it is determined in said step (d) that said one of the first and second phase differences is below said predetermined threshold.

3. The automatic phase control method as claimed in claim 2, wherein in step (e) said phase of said reference color signal is shifted by 90°.

4. An automatic phase controller, which receives a reproduced color signal, comprising:
   a region determiner for determining whether a phase difference between a burst signal from the reproduced color signal and a reference color signal generated by a reference color signal generator is within one of a positive and negative characteristic region of a phase comparator, wherein said phase difference is detected by said phase comparator; and
   a phase inverter connected to said reference color signal generator and said phase comparator, outputting said reference color signal to said phase comparator if said region determiner determines that said phase difference between said burst signal and said reference color signal is in said positive characteristic region of said phase comparator, and inverting the phase of said reference color signal and outputting a phase-inverted reference color signal to said phase comparator if said region determiner determines that said phase difference is in said negative characteristic region of said phase comparator.

5. The automatic phase controller as claimed in claim 4, further comprising a phase compensating circuit for compensating the phase of the reproduced color signal according to said phase difference detected by said phase comparator.

6. The automatic phase controller as claimed in claim 4, further comprising:
   a level comparator for determining whether the magnitude of said phase difference detected by said phase comparator is below a predetermined level; and
   a phase shifter connected between said reference color signal generator and said phase inverter, for shifting the phase of said reference color signal and providing the phase-shifted result to said phase inverter if said level comparator determines that the magnitude of said phase difference detected by said phase comparator is below said predetermined level.

7. The automatic phase controller as claimed in claim 6, wherein said phase shifter shifts the phase of said reference color signal by 90°.

8. The automatic phase control method as claimed in claim 1, wherein a phase error signal represents a phase error between the reproduced color signal and the reference color signal, and said positive characteristic region is a region in which the phase error signal increases in proportion to said first phase difference.

9. The automatic phase controller as claimed in claim 4, wherein a phase error signal represents a phase error between the reproduced color signal and the reference color signal, and said positive characteristic region is a region in which the phase error signal increases in proportion to said phase difference between the burst signal from the reproduced color signal and the reference color signal.

10. The automatic phase controller as claimed in claim 4, wherein a phase error signal represents a phase error between the reproduced color signal and the reference color signal, and said negative characteristic region is a region in which the phase error signal decreases in proportion to said phase difference between the burst signal from the reproduced color signal and the reference color signal.

11. An automatic phase controller, which receives a reproduced color signal, comprising:
   region determination means for determining whether a phase difference between a burst signal from the reproduced color signal and a reference color signal generated by a reference color signal generator is within one of a positive and negative characteristic region of a phase comparator, wherein said phase difference is detected by said phase comparator; and
   phase inversion means for outputting said reference color signal to said phase comparator if said region determination means determines that said phase difference between said burst signal and said reference color signal is in said positive characteristic region of said phase comparator, and inverting the phase of said reference color signal and outputting a phase-inverted reference color signal to said phase comparator if said region determination means determines that said phase difference is in said negative characteristic region of said phase comparator.

12. The automatic phase controller as claimed in claim 11, further comprising phase compensating means for compensating the phase of the reproduced color signal according to said phase difference detected by said phase comparator.

13. The automatic phase controller as claimed in claim 11, further comprising:

level comparison means for determining whether the magnitude of said phase difference detected by said phase comparator is below a predetermined level; and phase shifting means for shifting the phase of said reference color signal and providing a phase-shifted result to said phase inversion means if said level comparison means determines that the magnitude of said phase difference detected by said phase comparator is below said predetermined level.

14. The automatic phase controller as claimed in claim 13, wherein said phase shifting means shifts the phase of said reference color signal by 90°.

15. The automatic phase controller as claimed in claim 11, wherein a phase error signal represents a phase error between the reproduced color signal and the reference color signal, and said positive characteristic region is a region in which the phase error signal increases in proportion to said phase difference between the burst signal from the reproduced color signal and the reference color signal.

16. The automatic phase controller as claimed in claim 11, wherein a phase error signal represents a phase error between the reproduced color signal and the reference color signal, and said negative characteristic region is a region in which the phase error signal decreases in proportion to said phase difference between the burst signal from the reproduced color signal and the reference color signal.

* * * * *